(12) United States Patent
McCormack et al.

(10) Patent No.: US 11,010,015 B2
(45) Date of Patent: May 18, 2021

(54) SYSTEMS AND METHODS FOR FILTERING DATA IN VIRTUAL REALITY ENVIRONMENTS

(71) Applicant: FMR LLC, Boston, MA (US)

(72) Inventors: Peter McCormack, Dublin (IE); Michael Khan, County Limerick (IE); Brian Lough, Athlone (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/534,452

(22) Filed: Aug. 7, 2019

(65) Prior Publication Data

US 2021/0042009 A1    Feb. 11, 2021

(51) Int. Cl.

| | |
|---|---|
| *G06F 3/0481* | (2013.01) |
| *G06F 3/0346* | (2013.01) |
| *G06F 3/01* | (2006.01) |
| *G06F 3/0484* | (2013.01) |
| *G06T 19/20* | (2011.01) |

(52) U.S. Cl.
CPC .......... *G06F 3/04815* (2013.01); *G06F 3/017* (2013.01); *G06F 3/0346* (2013.01); *G06F 3/04845* (2013.01); *G06T 19/20* (2013.01); *G06T 2200/24* (2013.01); *G06T 2210/62* (2013.01); *G06T 2219/2012* (2013.01); *G06T 2219/2016* (2013.01)

(58) Field of Classification Search
None
See application file for complete search history.

(56) References Cited

U.S. PATENT DOCUMENTS

| | | |
|---|---|---|
| 5,675,746 A | 10/1997 | Marshall |
| 2011/0022208 A1* | 1/2011 | Bouffiou .......... G05B 19/41805 700/98 |
| 2017/0160518 A1* | 6/2017 | Lanman ................ G06T 19/006 |
| 2017/0193688 A1 | 7/2017 | Djorgovski et al. |
| 2017/0206707 A1 | 7/2017 | Guay et al. |

* cited by examiner

*Primary Examiner* — Brian M Butcher
(74) *Attorney, Agent, or Firm* — Proskauer Rose LLP

(57) ABSTRACT

A system is provided for visualizing data in a computerized visual environment. The system comprises (i) a viewing device that displays, to a user of the viewing device, a graphical user interface within a virtual three-dimensional space, (ii) a handheld device configured to allow the user to customize the display of a three-dimensional data visualization within the graphical user interface using hand motions made by the user, and (iii) a computing device coupled to the viewing device and the handheld device. The computing device is configured to cause to display to the user on the viewing device a filter plane overlaying the three-dimensional data visualization, detect a position of the filter plane that is movable by the user in the graphical user interface, and alter the three-dimensional visualization in the graphical user interface based on the detected position of the filter plane.

19 Claims, 6 Drawing Sheets

SYSTEMS AND METHODS FOR FILTERING DATA IN VIRTUAL REALITY ENVIRONMENTS

TECHNICAL FIELD

This application relates generally to methods and apparatuses for visualizing and manipulating data in a computerized visual environment, such as a virtual reality (VR) environment.

BACKGROUND

In recent years, hardware such as headsets, adapters, and viewers used in virtual reality or augmented reality environments have become widely available. In the case of VR, a user sees a visual environment comprised of computer-generated graphical objects and in the case of AR or MR, a user sees a visual environment comprised of both real-world objects and computer-generated graphics. In either case, the user can interact with the environment by moving his head and/or hands, and the user's movements are captured by the hardware and translated into the computerized environment using specialized software.

A virtual environment provides a user with a comprehensive space to visualize a vast amount of data. However, this can be visually overwhelming to a user, especially when the user is trying to hone in to extract desired information from a large data set. Such difficulty hampers data analysis. Existing VR visualization tools merely implement traditional methods for data filtering, such as filtering a data set prior to rendering the filtered data in the VR environment and permitting filtering only on the data set, but not against the visualization. These traditional approaches fail to leverage the potential of VR as a platform because a user cannot gain unique insight associated with VR data rendering.

SUMMARY

In view of these challenges, the systems and methods of the present invention enable a user to (i) visually filter data in a VR environment and (ii) minutely and precisely control the display of the filtered data. Specifically, the visual filtering aspect of the present invention enables a user to visually filter a data set in a three-dimensional virtual space. This allows the user to focus on the data of interest without being overwhelmed by the entire data set and discover insights unique to the VR environment. The contextual display aspect of the present invention allows a user, through variable opacity settings, for example, to control the displayed context between the filtered data and the rest of the data set. This allows a user to explore data in isolation or in context. Such contextual and visual filtering can be achieved in real time or near real time in response to the user interacting with a handheld device.

The invention, in one aspect, features a system for visualizing data in a computerized visual environment. The system includes a viewing device that displays, to a user of the viewing device, a graphical user interface within a virtual three-dimensional space. The graphical user interface is adapted to provide a three-dimensional visualization of a set of data in the virtual three-dimensional space. The system also includes a handheld device configured to allow the user to customize the display of the three-dimensional data visualization within the graphical user interface using hand motions made by the user. The system further includes a computing device coupled to the viewing device and the handheld device. The computing device is configured to receive an input from the user via the handheld device to filter the set of data and cause to display to the user on the viewing device a filter plane overlaying the three-dimensional data visualization in response to the input. The computing device is also configured to detect a position of the filter plane relative to the three-dimensional data visualization, where the position of the filter plane is movable by the user in the graphical user interface via the handheld device. The computing device is further configured to alter the three-dimensional visualization in the graphical user interface based on the detected position of the filter plane to produce an altered three-dimensional visualization. The altered visualization is adapted to visually emphasize a desired portion of the three-dimensional visualization relative to the filter plane and visually deemphasize an undesired portion of the three-dimensional visualization relative to the filter plane.

The invention, in another aspect, features a computerized method of visualizing data in a computerized visual environment. The method includes displaying, by a viewing device to a user of the viewing device, a graphical user interface within a virtual three-dimensional space. The graphical user interface provides a three-dimensional visualization of a set of data in the virtual three-dimensional space. The method includes capturing, by a handheld device, hand motions of the user to customize the display of the three-dimensional data visualization within the graphical user interface. The method also includes receiving, by a computing device coupled to the viewing device and the handheld device, an input from the user via the handheld device to filter the set of data and causing, by the computing device in response to the input, to display to the user on the viewing device a filter plane overlaying the three-dimensional data visualization. The method further includes detecting, by the computing device, a position of the filter plane relative to the three-dimensional data visualization, where the position of the filter plane is movable by the user in the graphical user interface via the handheld device. The method further includes altering, by the computing device, the three-dimensional visualization in the graphical user interface based on the detected position of the filter plane to produce an altered three-dimensional visualization. Altering the three-dimensional visualization comprises visually emphasizing a desired portion of the three-dimensional visualization relative to the filter plane and visually deemphasizing an undesired portion of the three-dimensional visualization relative to the filter plane.

Any of the above aspects can include one or more of the following features. In some embodiments, the computing device is configured to adjust an angle of display of the altered visualization based on a rotating gesture of the user via the handheld device.

In some embodiments, the computing device is configured to detect the user selecting at least one target data point in the altered visualization using the handheld device and visually identify one or more similar data points in the altered visualization based on the detecting. The one or more similar data points can comprise data points in the set of data that are within a user-defined range of the at least one target data point.

In some embodiments, visually deemphasizing an undesired portion of the three-dimensional visualization by the computing device comprises adjusting an opacity of the undesired portion based on an input from the user via the handheld device. In some embodiments, visually deemphasizing an undesired portion of the three-dimensional visualization by the computing device comprises assigning a different color to the undesired portion in comparison to the desired portion.

In some embodiments, the filter plane intersects the three-dimensional visualization in the three-dimensional space. In some embodiments, the desired portion and the undesired portion of the altered visualization are divided by the filter plane.

In some embodiments, the viewing device is a virtual reality (VR) headset, an augmented reality (AR) headset, or a mixed reality (MR) headset. In some embodiments, the computing device is a processor and a memory embedded in the viewing device or in the handheld device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
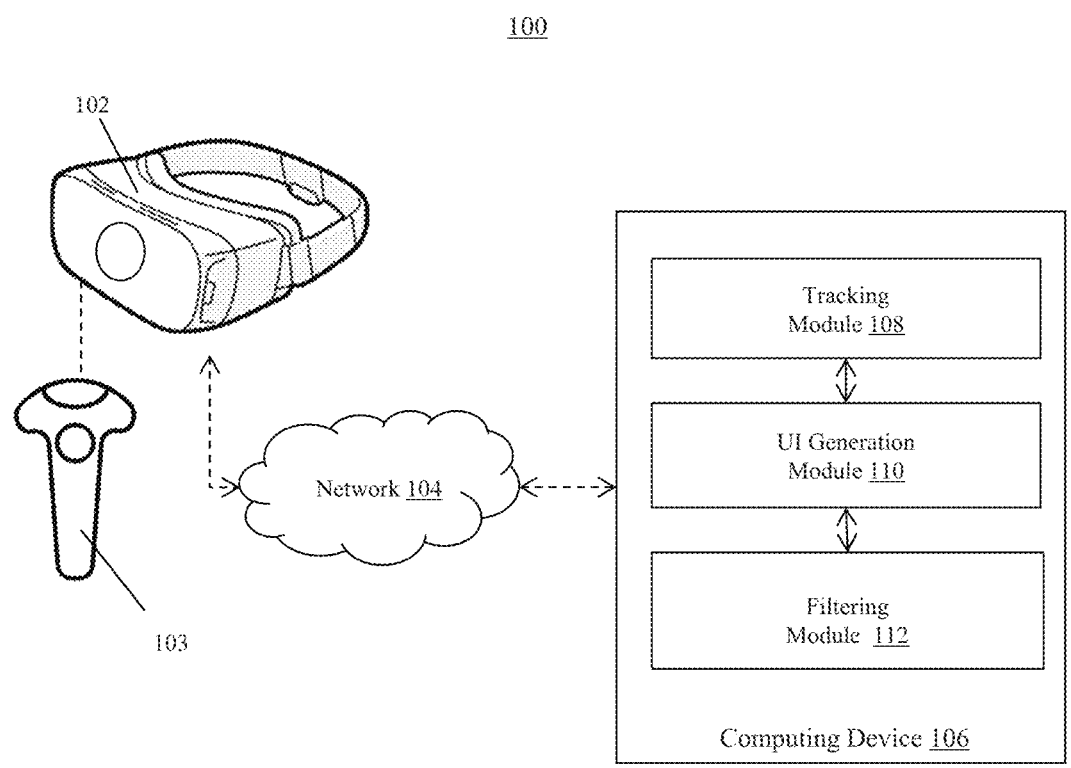
FIG. 1 is a block diagram of a system for enabling data filtering in a computerized visual environment.

FIG. 1 is a block diagram of a system 100 for enabling data filtering in a computerized visual environment. The system 100 includes a viewing device 102, a handheld device 103, a communications network 104, and a computing device 106 that includes a tracking module 108, a user interface generation module 110, and a filtering module 112.

The viewing device 102 enables a user to view computerized visual content, such as graphics, video, and related user interface elements in AR, VR, or MR environments, while the handheld device 103 (e.g., a controller) senses and captures motions of the user's hands as he or she moves within a physical environment. In some embodiments (as shown in FIG. 1), the viewing device 102 is a headset that a user wears to interact with the computerized visual content. In these embodiments, the headset and the handheld device 103 are equipped with circuitry to, e.g., detect and track movement of the user's head/body and the user's hands. The viewing device 102 and the handheld device 103 can be electrically and/or mechanically coupled together via a network connection. Exemplary headsets include, but are not limited to, the Meta 2™ AR headset available from Meta Company of San Mateo, Calif.; the VIVE™ VR System available from HTC Corporation of Taiwan; and the HoloLens™ available from Microsoft Corporation of Seattle, Wash. Exemplary handheld devices include, but are not limited to, the VIVE™ VR System available from HTC Corporation of Taiwan and the Oculus Rift™ controllers available from Facebook, Inc. of Menlo Park, Calif. It should be appreciated that other embodiments of the viewing device 102 and handheld device 103 can be used within the scope of invention described herein. For example, in some embodiments, the functionalities of the viewing device 102 and the sensor device 103 are integrated in a single physical device, such as a headset with integrated motion sensor to track a user's hand movement.

The viewing device 102 and handheld device 103 connect to the communications network 104 to communicate with the computing device 106 for providing input and receiving output in relation to performing data filtering in a computerized visual environment as described herein. The network 104 is typically a wide area network, such as the Internet and/or a cellular network. In some embodiments, the network 104 is comprised of several discrete networks and/or sub-networks (e.g., cellular to Internet). In some embodiments, the viewing device 102 and handheld device 103 can connect to the computing device 106 via a physical connection (e.g., cable).

The computing device 106 is a device including specialized hardware and/or software modules that execute on a processor and interact with memory modules of the server computing device 106, to receive data from other components of the system 100, transmit data to other components of the system 100, and perform functions relating to providing data filtering functions in a computerized visual environment as described herein. The computing device 106 includes several computing modules 108, 110, 112 that execute on the processor of the server computing device 106. In some embodiments, the modules 108, 110, 112 are specialized sets of computer software instructions programmed onto one or more dedicated processors in the computing device 106 and can include specifically designated memory locations and/or registers for executing the specialized computer software instructions.

Although the modules 108, 110, 112 are shown in FIG. 1 as executing within the same computing device 106, in some embodiments the functionality of the modules 108, 110, 112 can be distributed among a plurality of computing devices. As shown in FIG. 1, the computing device 106 enables the modules 108, 110, 112 to communicate with each other to exchange data for performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112 is described in detail below.

Also, it should be appreciated that, in some embodiments, the processing performed by the computing device 106 can be incorporated with the viewing device 102 and/or the handheld device 103. For example, a headset can include an embedded processor and memory that is programmed with modules 108, 110, 112 to perform the functions described herein.

Figure 2:
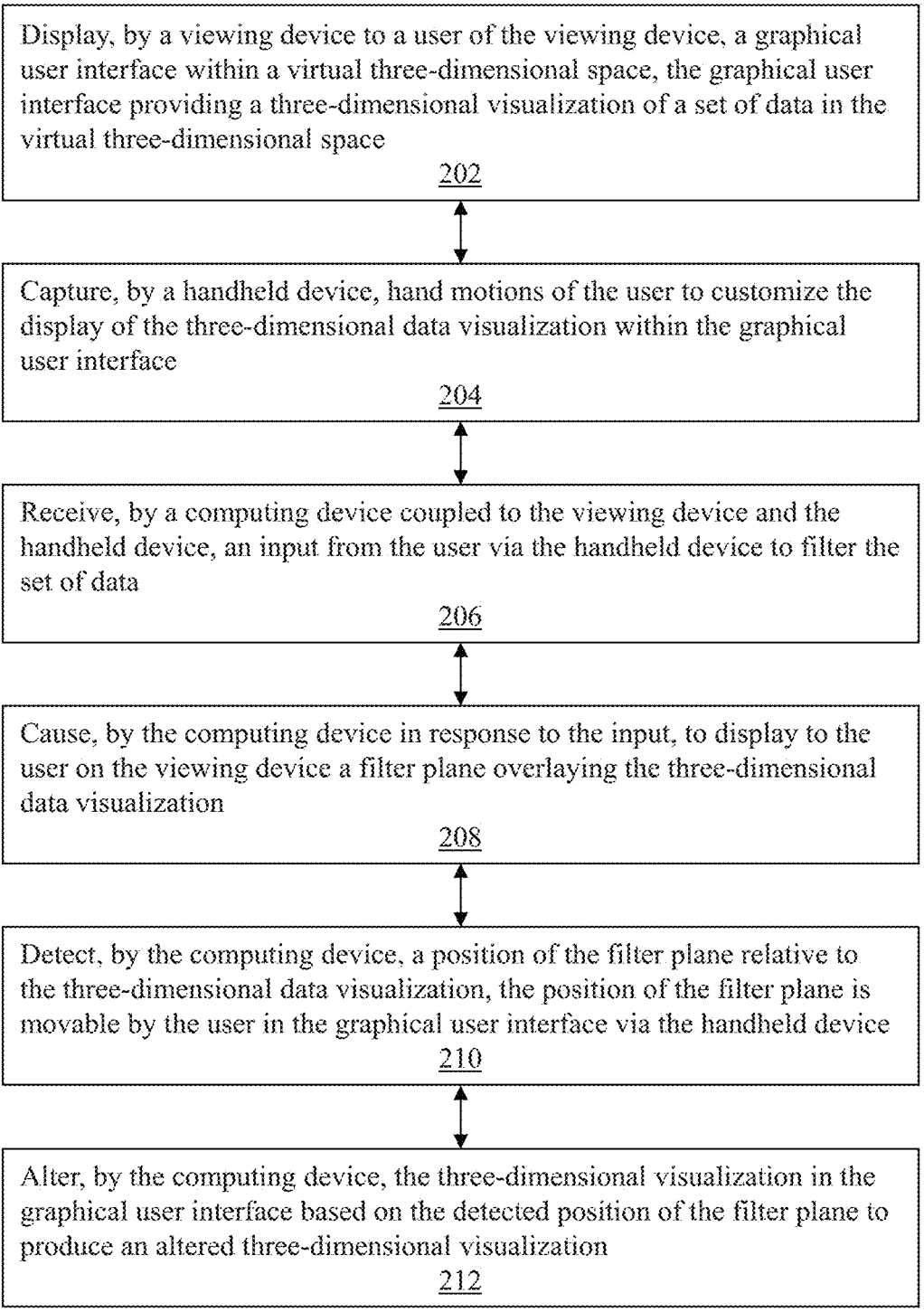
FIG. 2 is a flow diagram of a computerized method for enabling data filtering in a computerized visual environment.

FIG. 2 is a flow diagram of a computerized method 200 of providing data filtering functions in a computerized visual environment using the system 100 of FIG. 1. At step 202, a user (e.g., wearing a headset 102 and holding the handheld device 103 as described above) views a computerized visual environment that comprises graphical content within a virtual three-dimensional space. The graphical content includes a graphical user interface (GUI) with which the user interacts to control aspects of the graphical content. In some embodiments, the UI generation module 110 of the computing device 106 generates the GUI for display to the user via the viewing device 102, where the GUI is adapted to present a three-dimensional visualization (e.g., bar chart, ribbon chart, filled chart, or plot) of a set of data in the virtual three-dimensional space. The UI generation module 110 can also cause the GUI to display one or more options (e.g., menus, windows, widgets, bars, etc.) and visual elements selectable and movable by a user for filtering the three-dimensional data visualization.

At step 204, the user interacts with the handheld device 103 to customize the display of the three-dimensional data visualization within the virtual graphical user interface. For example, the user can move the handheld device 103 within the three-dimensional space in front of him to select an option from a menu displayed in the GUI for the purpose of filtering the data. The handheld device 103 is adapted to capture the location, gesture, and movement of the user's hand motion within the three-dimensional space.

At step 206, the selection made by the user via the handheld device 103, such as an option to filter the three-dimensional data visualization, is detected by the tracking module 108 of the computing device 106, which then transmits the filtering instruction to the other modules 110, 112 of the computing device 106 for processing. For example, at step 208, the UI generation module 108, in response to receiving the input from the user to filter the three-dimensional data visualization, causes the GUI to display a filter plane that overlays the existing data visualization in the virtual environment.

Figure 3:
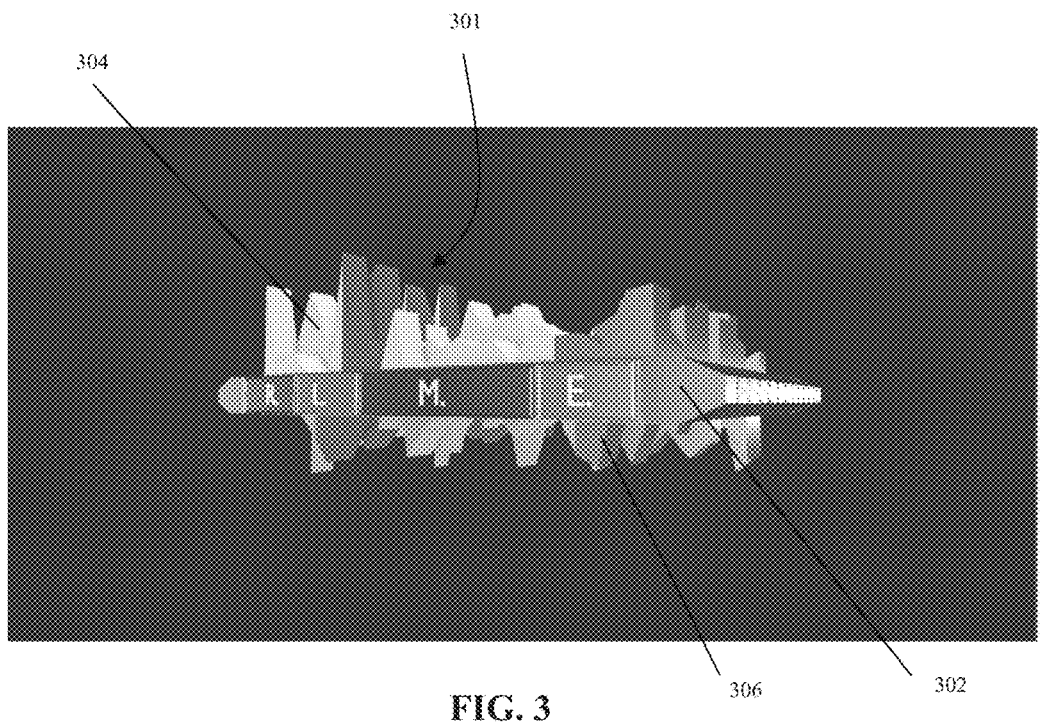
FIG. 3 is a diagram of an exemplary GUI generated by the system of FIG. 1 for displaying data visualization to a user via the viewing device.

FIG. 3 is a diagram of an exemplary GUI generated by the system 100 of FIG. 1 for displaying data visualization to a user via the viewing device 102. As shown in FIG. 3, the GUI includes a three-dimensional visualization 301 of a set of data. The GUI also displays a filter plane 302 that overlays the three-dimensional visualization 301. This filter plane 302 can appear in the same virtual space in response to an input from the user via the handheld device 103 (e.g., selection by the user from a menu) indicating the desire to filter the data represented by the three-dimensional visualization 301. In some embodiments, the filter plane 302 intersects a portion of the three-dimensional visualization 301. Specifically, the filter plane 302 is configured to delineate the separation between a desired portion 304 of the data visualization 301 and an undesired portion 306 of the data visualization 301. For example, as a default, the portion 304 of the data visualization 301 above the filter plane 302 can represent desired data that needs to be visually emphasized, while the portion 306 of the data visualization 301 below the filter plane 302 can represent undesired data that needs to be visually de-emphasized, such as obscured. In other examples, the above-plane portion 304 represents undesired data and the below-plane portion 306 represented the desired data. In some embodiments, the filter plane 302 is labeled, such as with the data labels "R," "L," "M" and "E" shown in FIG. 3, to characterize the data visualized.

In some embodiments, three-dimensional data visualization 301 is presented as a solid chart on the virtual display, as shown in FIG. 3. The custom chart can be automatically and dynamically generated by the computing device 106 by processing the numerical data in the data set from a data file and calculating the points on the chart that the data represent. Once the chart points are calculated, the shape of the chart is achieved by calculating the vertices, which are the points at each edge of the shape, of each side of the chart and then the triangles, which make up the outer surfaces of the shape.

Figure 9A:
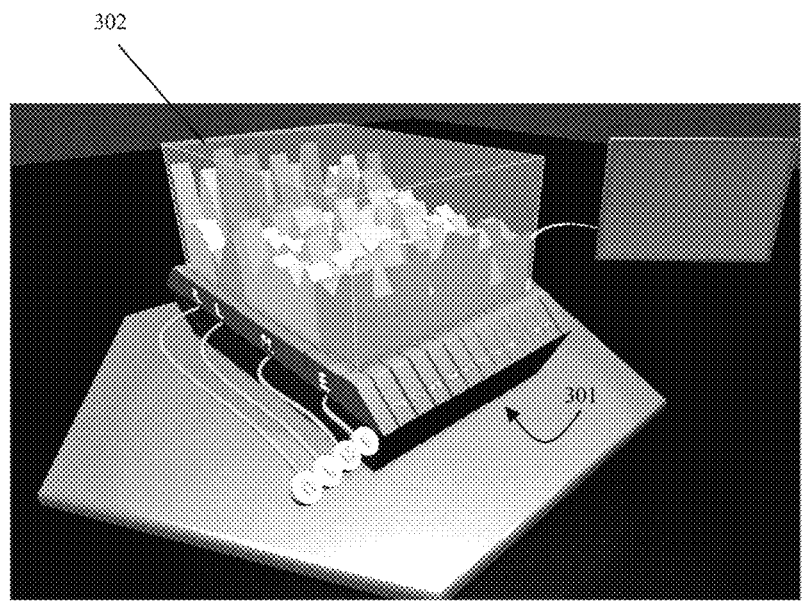
FIGS. 9a-d show varying stages of an exemplary GUI generated by the system of FIG. 1 as a user moves the filter plane in the virtual three-dimensional space.
Figure 9B:
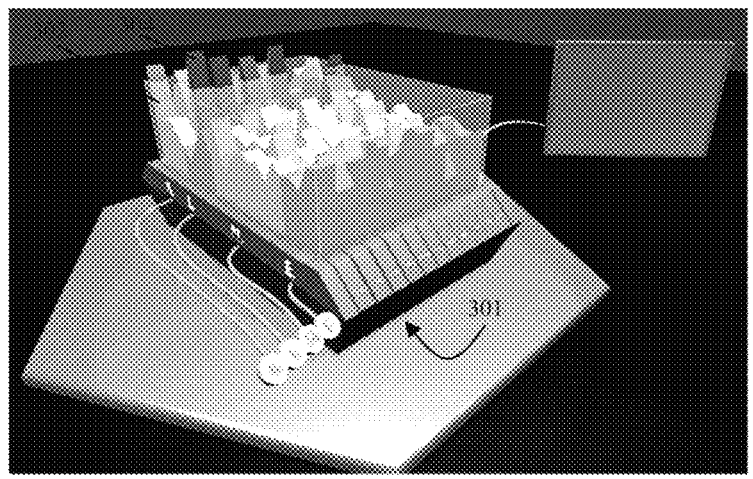
Figure 9C:
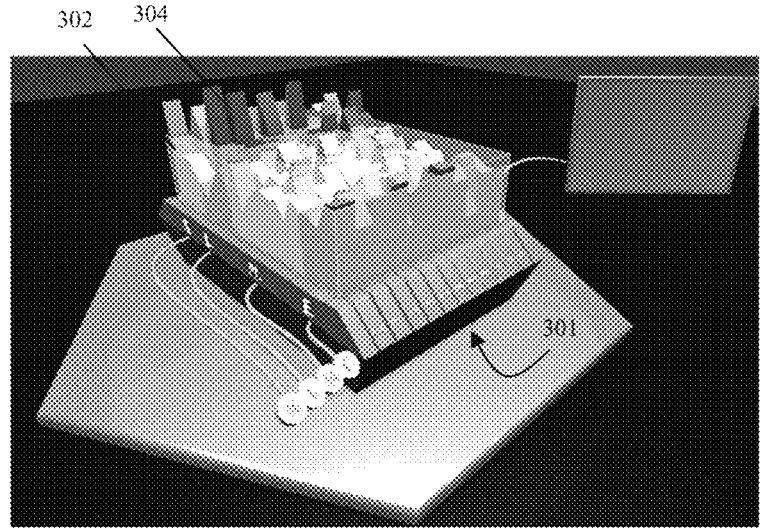
Figure 9D:
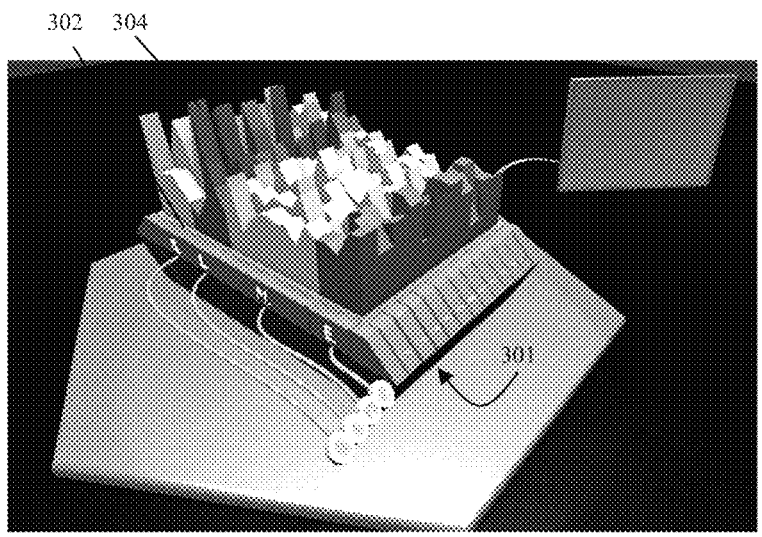

In addition, the filter plane 302 in the virtual three-dimensional space is movable by the user via the handheld device 103 to visually filter and customize the display of the three-dimensional data visualization 301. For example, the user can translate the filter plane 302 up or down (e.g., along the Y-axis), left or right (e.g., along the X-axis) or forward or backward (e.g., along the Z-axis) in relation to the three-dimensional visualization 301 to customize the selection of desired portion 304 and undesired portion 306. The user can also tilt the filter plane 302 at any angle in relation to the three-dimensional visualization 301 to customize the selection of desired and undesired portions 304, 306. In general, the user can move the filter plane 302 in any direction and/or at any angular orientation in relation to the three-dimensional visualization 301. In some embodiments, the user is prevented from moving the filter plane 302 beyond where the data visualization 301 is located. That is, filtering via the filter plane 302 is only valid if the filter plane 302 intersects at least a portion of the data visualization 301. In some embodiments, the user is limited to adjusting the filter plane 302 along a single axis. FIGS. 9a-d show varying stages of an exemplary GUI generated by the system of FIG. 1 as a user moves the filter plane 302 in the virtual three-dimensional space via the handheld device 103. As shown, the user can translate the filter plane 302 down along the y-axis until a desired portion 304 of the three-dimensional visualization 301 is exposed. Specifically, FIG. 9a shows, from a perspective view, the filter plane 302 extended to its full height, which encompasses the visualized data in its entirety. FIG. 9b shows, from a perspective view, the visualized data as the user lowers the height of the filter plane 302. Due to the transparency of the filter plane 302, the similarities among the data above the plane 302 (i.e., the desired data portion) are evident and are visualized in context relative to the data below the plane 302 (i.e., the undesired data portion). FIG. 9c shows, from a perspective view, more filtered data portion as the user continues to lower the height of the filter plane 302. FIG. 9d shows, from a perspective view, filtered data portion as the filter plane 302 is moved completely to the base. Thus, no filtering is applied in this example.

At step 210, the computing device 106 tracks and detects a position of the filter plane moved by the user relative to the three-dimensional data visualization in the virtual environment. For example, the tracking module 108 of the computing device 106 can receive from the handheld device 103 the gesture and movement data associated with a user moving the filter plane and execute an object detection/tracking algorithm to map the location of the user's hand to the coordinate system used in the virtual environment. The tracking module 108 can transmit the mapped location of the filter plane as gestured by the user to the filtering module 112 of the computing device 106. The filtering module 112 is then configured to filter the data set represented by the three-dimensional visualization in the virtual environment based the mapped destination of the filter plane. Specifically, the filtering module 112 receives as an input the new position of the filter plane in the virtual environment, determines one or more filtering parameters/thresholds corresponding to the new position of the filter plane, and uses the parameters/thresholds to filter the visualized data set such that the data in the data set that exceeds the threshold (e.g., above the threshold) is tagged as desired data and the data in the data set that does not exceed the threshold (e.g., below the threshold) is tagged as undesired data.

At step 212, the computing device 106 alters the three-dimensional visualization in the GUI of the virtual environment based on the determination of the filtering module 112. Specifically, the filtering module 112 transmits to the UI generation module 110 information related to the filtering, including (i) recalculated new position of the filter plane, (ii) recalculated new size of the filter plane to ensure that it substantially intersects the three-dimensional visualization at the new position, and (iii) identification of the desired data and the undesired data of the data set relative to the adjusted filter plane. The UI generation module 110 is adapted to update and/or re-render the current three-dimensional data visualization in the GUI to translate the filter plane to the desired position relative to the data visualization, adjust the size of the filter plane to encompass the data visualization at the plane of intersection, and visually emphasize the desired data portion in relation to the translated filter plane while visually de-emphasize the undesired portion. In some embodiments, execution of steps 210 and 212 for filtering and rendering are in real time or in near real time in response to a user adjusting the filter plane. This allows the user to finely tune the filtering to minutely and precisely control the displayed context.

Figure 4:
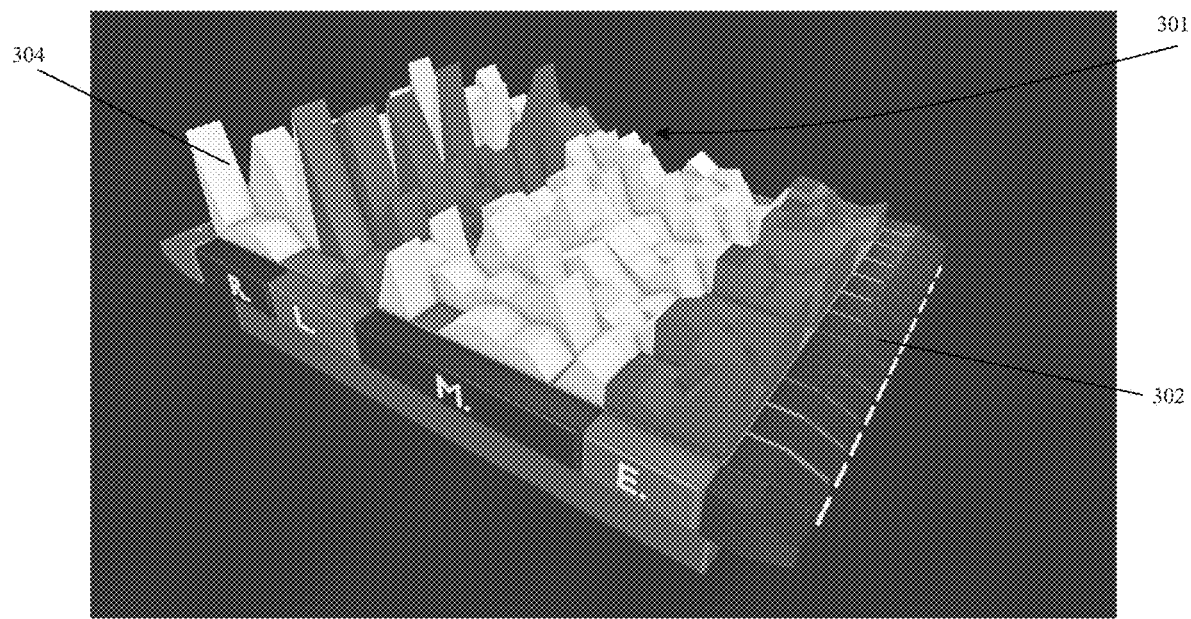
FIG. 4 is a diagram of exemplary GUI generated by the system of FIG. 1 for displaying the data visualization of FIG. 3 with filtering applied.

Thus, following the process 200 of FIG. 2, a user can employ natural physical actions (i.e., hand motions and gestures) to finely position the filter plane with the handheld device 103 in order to control the filtering of a data set displayed in a virtual environment. In some embodiments, visually emphasizing the desired data portion and de-emphasizing the undesired data portion includes allowing a user to adjust, via his handheld device 103, an opacity setting associated with each data portion. For example, the user can use the touchpad or thumb-stick of the handheld device 103 to set the undesired data portion (e.g., the data below the filter plane) to be more opaque in comparison to the desired data portion (e.g., the data above the filter plane). Depending on the setting selected by the user via the handheld device 103, the UI generation module 112 can set the undesired data portion to be partially or completely opaque, i.e., invisible to show or hide the undesired data portion. FIG. 4 is a diagram of exemplary GUI generated by the system 100 of FIG. 1 for displaying the data visualization 301 of FIG. 3 with filtering applied. As shown, in response to a user specifying the undesired portion 306 of the data set (i.e., the data portion below the filter plane 302) to be set to entirely opaque, the UI generation module 110 is adapted to display only the desired data portion 304 relative to, i.e., above, the filter plane 302. In general, by controlling the opacity of different sections of data visualization in the three-dimensional virtual space, a user has the flexibility of choosing to view the desired data portion 304 in context to other data or show the desired data portion 304 in isolation for more focused scrutiny, such as the visualization of FIG. 4. In some embodiments, visually emphasizing the desired data portion while de-emphasizing the undesired data portion involves assigning different colors to the data portions. Thus, the different visual filtering techniques of the present invention reduce the noise associated with the undesired data portion, thereby enabling a user to focus his attention on the desired data selection, while permitting the user to clearly see similarities in the exposed data. It also allows the user to instantaneously investigate the selected data in context to the overall data set.

Figure 5:
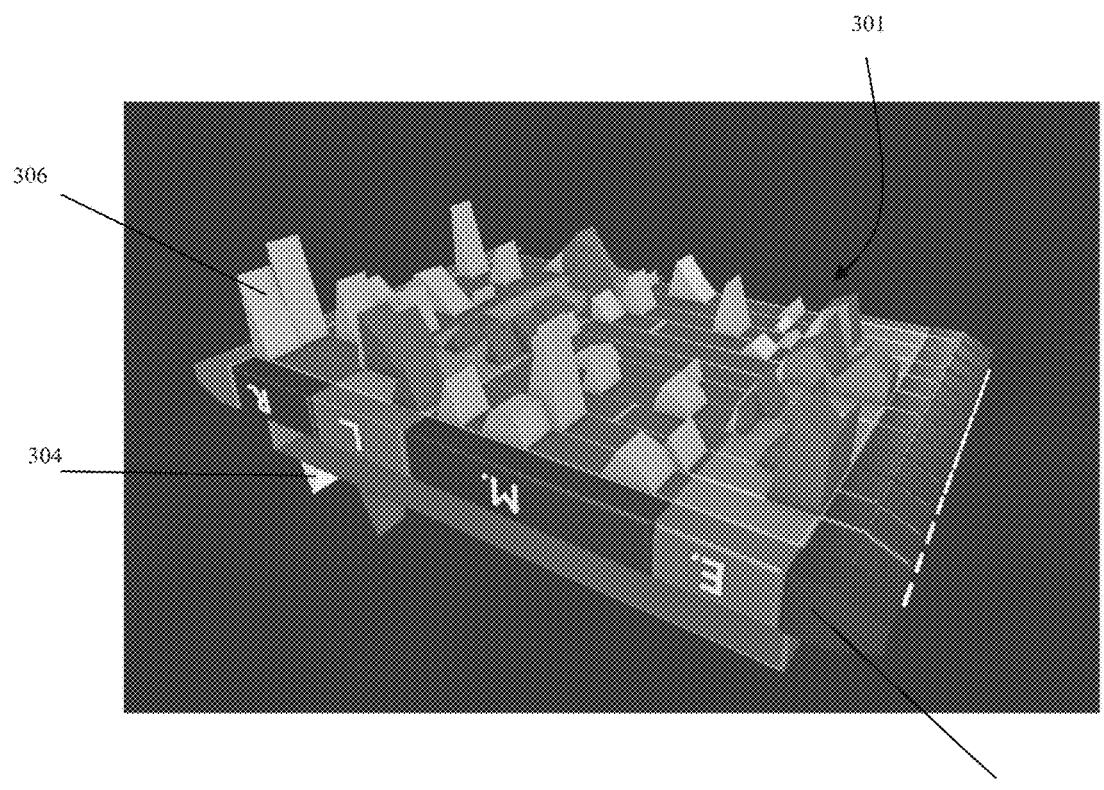
FIG. 5 is another diagram of exemplary GUI generated by the system of FIG. 1 for displaying the data visualization of FIG. 3 with filtering applied.
Figures 6, 7:
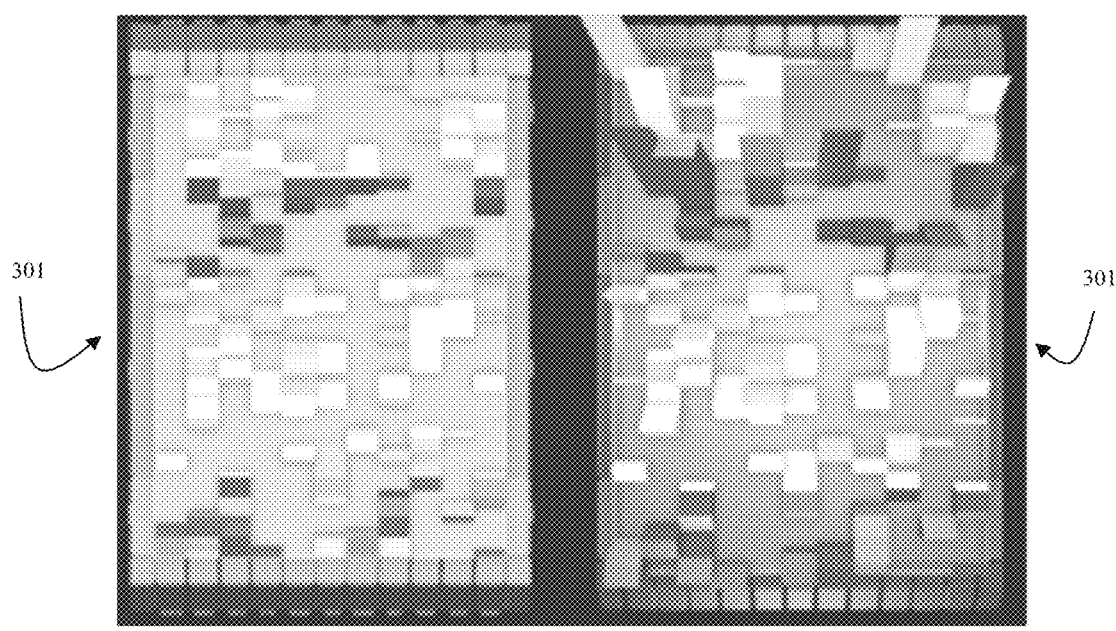
FIG. 6 is a diagram of exemplary GUI generated by the system of FIG. 1 for displaying the data visualization of FIG. 3 from an orthographical view with filtering applied.
FIG. 7 is a diagram of exemplary GUI generated by the system of FIG. 1 for displaying the data visualization of FIG. 3 from a perspective view with filtering applied.

In some embodiments, the system 100 allows a user to freely rotate, tilt or otherwise move the filtered data visualization, including the filter plane with the filter settings applied, in the virtual three-dimensional space using the handheld device 103. For example, in response to a rotating hand motion by the user via the handheld device 103, the tracking module 108 in conjunction with the UI generation module 110 can adjust an angle of display of the filtered data visualization to a positional view that suits the user. The user can also translate the filtered data visualization in the three-dimensional virtual space. Such control allows the user to position the visualization at a particular view that enhances data exploration and discovery. FIG. 5 is another diagram of exemplary GUI generated by the system 100 of FIG. 1 for displaying the data visualization 301 of FIG. 3 with filtering applied. As shown, the data visualization is filtered such that the undesirable portion 306 is highlighted in red and the desirable portion 304 is highlighted in green. Further, the display of FIG. 5 if flipped about 180 degrees in comparison to the view of FIG. 3 such that the undesirable portion 306 appears on top of the filter plane 302 and the desire portion 304 appears below. FIG. 6 is a diagram of exemplary GUI generated by the system 100 of FIG. 1 for displaying the data visualization 301 of FIG. 3 from an orthographical view with filtering applied. In this GUI, a user can clearly see the spacing between data clusters. FIG. 7 is a diagram of exemplary GUI generated by the system 100 of FIG. 1 for displaying the data visualization 301 of FIG. 3 from a perspective view with filtering applied. In this GUI, a user can more clearly see the peaks in the data clusters.

Figure 8:
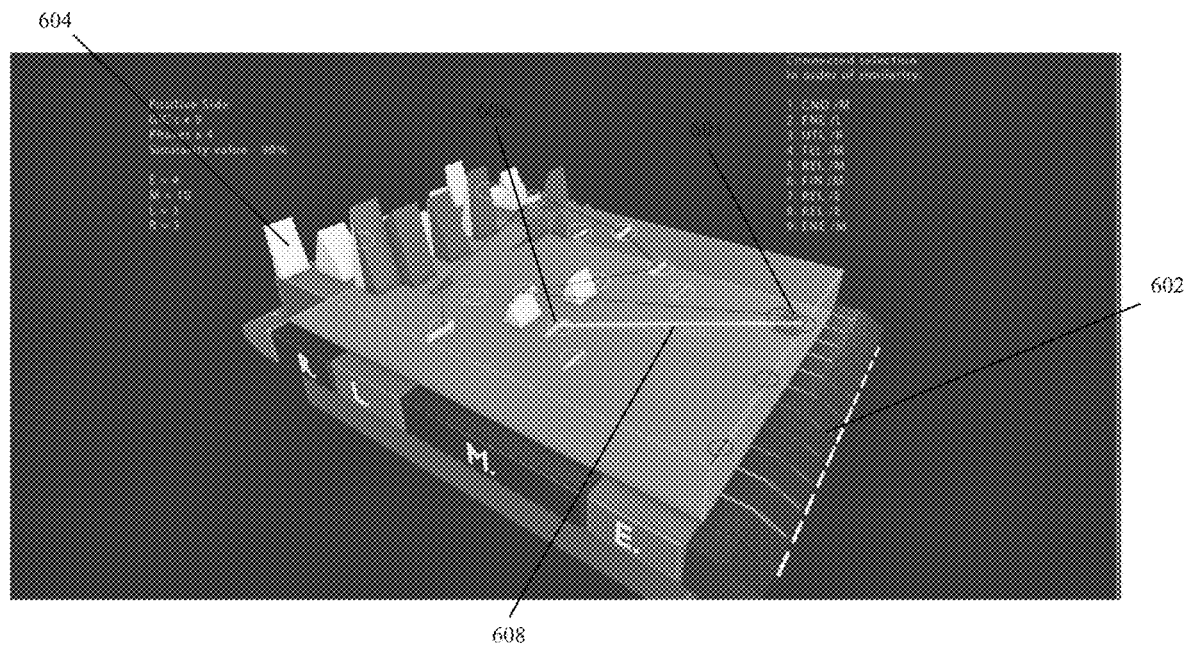
FIG. 8 is an exemplary GUI generated by the system of FIG. 1 for analyzing filtered data visualization.

In some embodiments, after the data visualization has been filtered, the user is able to select one or more data points from the desired portion of the displayed data visualization for further exploration. For example, with the filter plane applied and a set of desired data points visually emphasized relative to (e.g., displayed above) the filter plane, a user can select at least one data point via the handheld device 103. Based on the selection, the filtering module 112 of the computing device 106 automatically determines other data points similar to the selected data point, such as data points with similar values as defined by the user (e.g., within a range of about 2%). The UI generation module 110 of the computing device 106 can visually group these points by, for example, highlighting them in the data visualization display. FIG. 8 is an exemplary GUI generated by the system 100 of FIG. 1 for analyzing filtered data visualization. In this GUI, the desired data portion 604 after filtering is shown in green above the filter plane 602. Using the handheld device 103, a user can select (e.g., click on) a data point 601 in the desired data portion 604 and similar data (e.g., data within a percentile similarity of the selected data point 601) are identified in circles 606, or by any other reasonable means, in the same three-dimensional visualization. In some embodiments, the circles 606 are transparent such that even if a similar data point is obscured by another object the user still knows it is present. In some embodiments, information related to the similar data points, such as their values, are displayed in the GUI. The information of the similar data points can be presented in an order based on their degree of similarity to the selected data point 601. In some embodiments, a user can annotate the data visualization by drawing, using the handheld device 103, one or more lines 608 each connecting a similar data point to the selected data point 601. The GUI can display information related to the lines 608, such as the length of the line 608 to illustrate the distance between the similar data point and the selected data point 601. Generally, a user can draw a line between any two points in the data visualization to query the relationship between them.

In some embodiments, different portions of the filtered data are color coded to distinguish them by certain characteristics, such as between the start of one phase and that of the next phase. In some embodiments, a user can copy instances of filtered data for future reference. For example, a user can make a copy of the filter plane and the desired data portion relative to (e.g., above) the filter plane and store the copy in a memory of the computing device 106. The copied data is in such a format that the filtered data visualization is easily reconstructed in a three-dimensional virtual space.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, mag-neto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for visualizing data in a computerized visual environment, the system comprising:
    a viewing device that displays, to a user of the viewing device, a graphical user interface within a virtual three-dimensional space, the graphical user interface adapted to provide a three-dimensional visualization of a set of data in the virtual three-dimensional space;
    a handheld device configured to allow the user to customize the display of the three-dimensional data visualization within the graphical user interface using hand motions made by the user;
    a computing device coupled to the viewing device and the handheld device, the computing device configured to:
        receive an input from the user via the handheld device to filter the set of data;
        cause to display to the user on the viewing device a filter plane overlaying the three-dimensional data visualization in response to the input;
        detect a position of the filter plane relative to the three-dimensional data visualization, the position of the filter plane is movable by the user in the graphical user interface via the handheld device;
        alter the three-dimensional visualization in the graphical user interface based on the detected position of the filter plane to produce an altered three-dimensional visualization, the altered visualization is adapted to visually emphasize a desired portion of the three-dimensional visualization relative to the filter plane and visually deemphasize an undesired portion of the three-dimensional visualization relative to the filter plane.

2. The system of claim 1, wherein the viewing device is a virtual reality (VR) headset, an augmented reality (AR) headset, or a mixed reality (MR) headset.

3. The system of claim 1, wherein the computer device is further configured to adjust an angle of the altered visualization based on a rotating movement of the user via the handheld device.

4. The system of claim 1, wherein the desired portion and the undesired portion of the altered visualization are divided by the filter plane.

5. The system of claim 1, wherein deemphasizing the undesired portion of the three-dimensional visualization comprises adjusting an opacity of the undesired portion based on an input from the user via the handheld device.

6. The system of claim 1, wherein deemphasizing the undesired portion of the three-dimensional visualization comprises assigning a different color to the undesired portion in comparison to the desired portion.

7. The system of claim 1, wherein the computing device is further configured to visually identify similar data points in the altered visualization based on the user selecting at least one target data point using the handheld device.

8. The system of claim 7, wherein the similar data points comprise data points in the set of data that are within a user-defined range of the at least one target data point.

9. The system of claim 1, wherein the filter plane intersects the three-dimensional visualization in the three-dimensional space.

10. The system of claim 1, wherein the computing device is a processor and a memory embedded in the viewing device or in the handheld device.

11. A computerized method of visualizing data in a computerized visual environment, the method comprising:
    displaying, by a viewing device to a user of the viewing device, a graphical user interface within a virtual three-dimensional space, the graphical user interface providing a three-dimensional visualization of a set of data in the virtual three-dimensional space;
    capturing, by a handheld device, hand motions of the user to customize the display of the three-dimensional data visualization within the graphical user interface;
    receiving, by a computing device coupled to the viewing device and the handheld device, an input from the user via the handheld device to filter the set of data;
    causing, by the computing device in response to the input, to display to the user on the viewing device a filter plane overlaying the three-dimensional data visualization;
    detecting, by the computing device, a position of the filter plane relative to the three-dimensional data visualization, the position of the filter plane is movable by the user in the graphical user interface via the handheld device; and
    altering, by the computing device, the three-dimensional visualization in the graphical user interface based on the detected position of the filter plane to produce an altered three-dimensional visualization, altering the three-dimensional visualization comprises:
        visually emphasizing a desired portion of the three-dimensional visualization relative to the filter plane; and
        visually deemphasizing an undesired portion of the three-dimensional visualization relative to the filter plane.

12. The computerized method of claim 11, further comprising adjusting, by the computing device, an angle of display of the altered visualization based on a rotating gesture of the user via the handheld device.

13. The computerized method of claim 11, further comprising:
    detecting, by the computing device, the user selecting at least one target data point in the altered visualization using the handheld device; and
    visually identifying, by the computing device, one or more similar data points in the altered visualization based on the detecting,
    wherein the one or more similar data points comprise data points in the set of data that are within a user-defined range of the at least one target data point.

14. The computerized method of claim 11, wherein visually deemphasizing an undesired portion of the three-dimensional visualization comprises adjusting an opacity of the undesired portion based on an input from the user via the handheld device.

15. The computerized method of claim 11, wherein visually deemphasizing an undesired portion of the three-dimensional visualization comprises assigning a different color to the undesired portion in comparison to the desired portion.

16. The computerized method of claim 11, wherein the filter plane intersects the altered visualization in the three-dimensional space.

17. The computerized method of claim 16, wherein the desired portion and the undesired portion of the altered visualization are divided by the filter plane.

18. The computerized method of claim 11, wherein the viewing device is a virtual reality (VR) headset, an augmented reality (AR) headset, or a mixed reality (MR) headset.

19. The computerized method of claim 11, wherein the computing device is a processor and a memory embedded in the viewing device or in the handheld device.

\* \* \* \* \*